(12) United States Patent
Strauss et al.

(10) Patent No.: US 8,108,291 B1
(45) Date of Patent: *Jan. 31, 2012

(54) SYSTEM AND METHOD FOR CREATING TRADE-RELATED ANNOTATIONS IN AN ELECTRONIC TRADING ENVIRONMENT

(75) Inventors: Mark L. Strauss, Chicago, IL (US); Peter Francis Ziemkiewicz, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 167 days.

This patent is subject to a terminal disclaimer.

(21) Appl. No.: 12/540,059

(22) Filed: Aug. 12, 2009

Related U.S. Application Data

(63) Continuation of application No. 10/260,644, filed on Sep. 30, 2002, now Pat. No. 7,610,237.

(51) Int. Cl.
*G06Q 40/00* (2006.01)
(52) U.S. Cl. .......... 705/37; 705/35; 705/36; 705/39; 705/44
(58) Field of Classification Search .......... 705/35–45
See application file for complete search history.

(56) References Cited

U.S. PATENT DOCUMENTS

| | | | |
|---|---|---|---|
| 6,484,156 B1 * | 11/2002 | Gupta et al. | 707/802 |
| 6,772,132 B1 | 8/2004 | Kemp, II et al. | |
| 7,054,812 B2 | 5/2006 | Charlesworth et al. | |
| 7,127,424 B2 | 10/2006 | Kemp, II et al. | |
| 7,243,301 B2 * | 7/2007 | Bargeron et al. | 715/205 |
| 7,565,319 B1 | 7/2009 | Strauss et al. | |
| 7,610,237 B1 | 10/2009 | Strauss et al. | |
| 7,672,895 B2 | 3/2010 | Mintz et al. | |
| 2001/0042098 A1 | 11/2001 | Gupta et al. | |
| 2002/0052740 A1 * | 5/2002 | Charlesworth et al. | 704/220 |
| 2002/0059342 A1 | 5/2002 | Gupta et al. | |
| 2002/0083094 A1 | 6/2002 | Golovchinsky et al. | |
| 2002/0099552 A1 | 7/2002 | Rubin et al. | |
| 2002/0130868 A1 | 9/2002 | Smith | |
| 2002/0186236 A1 | 12/2002 | Brown et al. | |
| 2003/0004853 A1 * | 1/2003 | Ram et al. | 705/37 |
| 2003/0009411 A1 | 1/2003 | Ram et al. | |

OTHER PUBLICATIONS

"Market Information Display Method for Objects Stocks in Electronic Trading System, Involves Displaying Indicators Representing Price Levels for Objects on Common Static Price Axis", Burns M J, dated Nov. 13, 2002.*

* cited by examiner

*Primary Examiner* — Ella Colbert
*Assistant Examiner* — Hai Tran
(74) *Attorney, Agent, or Firm* — McDonnell Boehnen Hulbert & Berghoff LLP

(57) ABSTRACT

A client terminal displays a trading screen interface and an annotation interface in relation to the trading screen interface. The annotation interface allows a trader to enter trade-related annotations in a quick and efficient manner or flag a predetermined time and input annotations to be associated with the flagged time a later time, while the trading screen interface allows the trader to make trades at the most favorable prices and in a speedy manner. The annotation interface may alternatively not be displayed and allow for audio input.

22 Claims, 7 Drawing Sheets

SYSTEM AND METHOD FOR CREATING TRADE-RELATED ANNOTATIONS IN AN ELECTRONIC TRADING ENVIRONMENT

CROSS-REFERENCE TO RELATED APPLICATIONS

This application is a continuation of U.S. patent application Ser. No. 10/260,644 filed Sep. 30, 2002, now U.S. Pat. No. 7,610,237, the contents of which are fully incorporated herein by reference.

FIELD OF INVENTION

The present invention is directed towards electronic trading. More specifically, the present invention is directed towards providing means for recording annotations related to trading sessions.

BACKGROUND

Over the years, institutions have existed that allowed people to buy and sell tradable objects from one another. Since the advent of traditional trading methods, the basic manner in which such trading has been conducted has remained essentially the same. However, recent technological advances have provided for the evolution of trading methods from a manually intensive process to technologically enabled electronic platforms. The rapid increase in the number of people performing trades electronically has continued to account for more and more of the total percentage of transactions in the market. In fact, what was previously seen as a supplement to the traditional pit trading, now, electronic trading is expected to continue to transform the trading process as modern technology advances.

Many exchanges throughout the world now support electronic trading. Electronic trading has made it possible for an increasing number of people to actively participate in a market at any given time. The increase in the number of potential market participants has advantageously led to, among other things, a more competitive market and greater liquidity.

Exchanges that support electronic trading are generally based on a host, one or more computer networks, and clients. In general, the host includes one or more centralized computers to form the electronic heart. Its operations typically include order matching, maintaining order books and positions, price information, and managing and updating a database that records such information. The host is also equipped with an external interface that maintains uninterrupted contact to the clients and possibly other trading-related systems.

Typically, market participants link to the host through one or more networks. A network is a group of two or more computers linked together. There are many types of networks such as local area networks and wide area networks. Networks can also be characterized by topology, protocol, and architecture. However, any type of network configuration can be used as an electronic trading environment. For example, some market participants may link to the host through a direct connection such as a T1 or ISDN. Alternatively, some participants may link to the exchange through direct connections and through other common network components such as high-speed servers, routers, gateways, and so on.

Regardless of the way in which a connection is established, software running on the clients allows people to log onto one or more exchanges and participate in one or more markets. Some clients run software that creates specialized interactive trading screens. In general, the trading screens enable people to enter orders into the market, obtain market quotes, and monitor positions. The range and quality of features available on such screens vary according to the specific software application being run.

The success of a trader who trades in a competitive electronic trading environment depends on many factors. One of the most important factors is how fast a trader can make a trade. Another important factor is the ability of a trader to predict market trends and develop his/her trading strategies. Some traders keep journals (diaries) for making trade annotations that are used to document traders' trading activities and market trends during a particular trading day or a longer time period. Using such a journal and assuming that the information in the journal is kept up to date, a trader may view past market and personal performance in the hopes of predicting future market trends and potentially avoiding previous negative trading strategies.

However, in an electronic market where volume and speed are magnified, a trader might have difficulties maintaining such a journal. For example, if a user trading on an electronic platform is keeping a journal including information related to the market and trader's activities, and, at a certain point in time, the market volume increases and price updates begin to flow at an accelerated rate, the user might have serious difficulties maintaining the journal up to date. Moreover, as the market's volatility increases, a user may find it even more difficult to organize the journal information so that it can be easily recalled at a later date.

Further, in some circumstances when the market is quickly fluctuating, a trader maintaining a journal may devote too much time to the maintenance of accurate information in the journal. This, however, may cause a trader to miss favorable trading opportunities and could eventually prevent the trader from actively participating in the electronic market altogether. Further, when notes are taken in rush, it might be difficult for a trader to decipher the notes at a later time, or correlate the notes to a particular time during a trading day when the notes were taken.

Thus, it is still desirable for electronic trading applications to offer tools that can assist a trader in trading in an electronic trading environment, help the trader to make trades at the most favorable prices in a speedy and accurate manner, while allowing the trader to conveniently record any desirable information.

BRIEF DESCRIPTION OF THE DRAWINGS

Example embodiments of the present invention are described herein with reference to the following drawings, in which.

DETAILED DESCRIPTION OF THE PREFERRED EMBODIMENT(S)

It is beneficial to allow a trader to enter trade annotations in a manner that allows a trader to quickly and conveniently record desired information, while allowing the trader to make trades at the most favorable prices in a speedy and accurate manner. According to one preferred embodiment, an annotation interface is provided in conjunction with an electronic trading interface, for the purpose of documenting trade-related data or other data that a trader may archive and retrieve in its entirety at a later time. The embodiments described herein provide such an annotation interface as means for improving efficiency of the note taking procedure in an electronic trading environment.

According to embodiments described hereinafter, the annotation interface is displayed in relation to a trading interface so that a trader is given an improved ability to focus on the market's activities while documenting trade-related data. Further, the provided annotation interface may encompass multiple exchanges, providing a trader with a single location in which to take annotations and observe the activity of the multiple markets.

Additionally, according to one embodiment, a user may flag a particular time, and then may input data into an annotation record at a later time. In such an embodiment, the annotation record is associated with the flagged time. Also, an annotation interface according to one example embodiment offers the ability to enter trade-related data in an organized and arranged manner, i.e., into categories or subject fields. Thus, the annotation interface provides means for storing and retrieving data that is structured, thereby benefiting both in the entering of such data and potentially the knowledge gained from the review of such organized data.

While the present invention is described herein with reference to illustrative embodiments for particular applications, it should be understood that the present invention is not limited thereto. Those having ordinary skill of art will recognize that many additional modifications and embodiments are possible as well.

Figure 1:
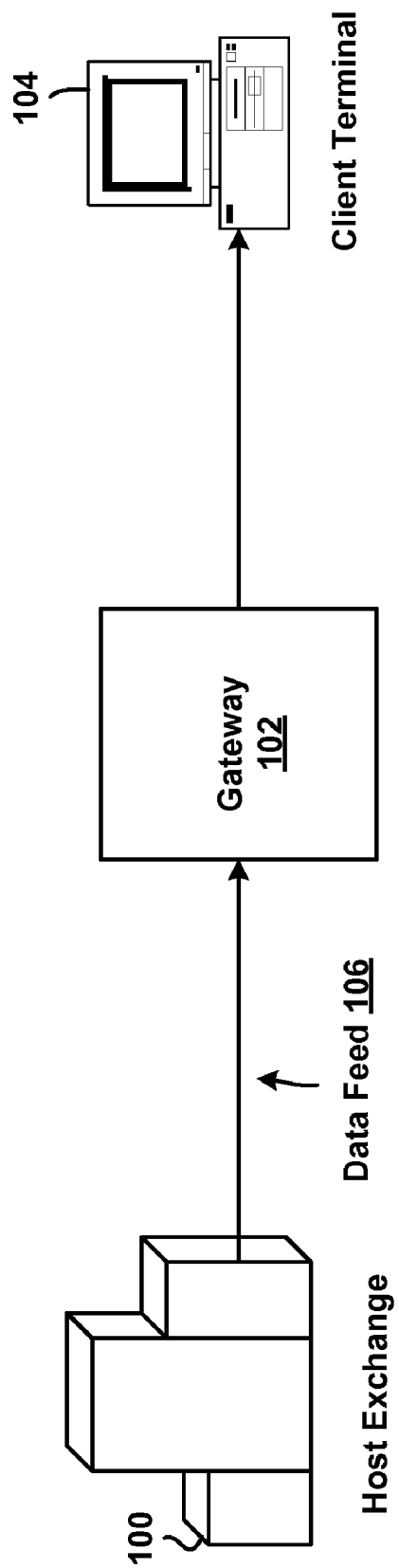
FIG. 1 is an example of a network configuration for a communication system utilized to access one or more exchanges.

FIG. 1 shows an example system that may be used to implement network connection between an exchange and client terminals. It should be understood, however, that this and other arrangements described herein are set forth for purposes of example only. As such, those skilled in the art will appreciate that other arrangements and other elements (e.g., machines, interfaces, functions, orders of functions, etc.) can be used instead, and some elements may be omitted altogether. Further, as in most telecommunications applications, those skilled in the art will appreciate that many of the elements described herein are functional entities that may be implemented as discrete or distributed components or in conjunction with other components, and in any suitable combination and location.

Still further, various functions described herein as being performed by one or more entities may be carried out by hardware, firmware and/or software logic. For instance, various functions may be carried out by a processor executing a set of machine language instructions stored in memory. Provided with the present disclosure, those skilled in the art can readily prepare appropriate computer instructions to perform such functions.

Referring back to FIG. 1, the illustrated system includes a host exchange 100, a gateway 102, and a client terminal 104. It should be understood that even though the example system illustrates only one client terminal 102 communicating with a single host exchange 100, the client terminal 102 could also communicate with more than one host exchange via the gateway 102 or other gateways corresponding to each host exchange. Further, it should be understood that the example system is not limited to a single client terminal. In an alternative embodiment, a trading house including a plurality of client terminals may connect to the host exchange 100 via the gateway 102.

The host exchange 100 may include the Chicago Board of Trade ("CBOT"), the New York Stock Exchange ("NYSE"), the Chicago Mercantile Exchange ("CME"), the Xetra (a German stock exchange), or the European derivatives market ("Eurex"). However, it should be understood that the exchanges could also include any other existing or later developed exchanges. Further, it should be understood that the present invention is not limited to any particular network architecture or trading application, but rather may be applied with utility on any client device in any network that can be used for electronic trading. Furthermore, the invention is not limited to a completely electronic trading environment where orders are sent to an electronic matching engine. For example, the invention could be utilized with an electronic trading application, which sends orders electronically to a terminal where a person (e.g., a floor broker) executes those orders in a traditional open outcry trading floor.

The host exchange 100 connects to the client terminal 104 via the gateway 102. The gateway 102, as is known in the art, may include one or more computers, or software programs, and receives information from the host exchange 100 and sends the information down to the client terminal 104. Preferably, the gateway 102 receives data from the host exchange 100 and converts the received data to a format compatible with the protocols used on the client terminal 104. Alternatively, the conversion could be performed at the client terminal 104.

The host exchange 100 provides market information to the client terminal 102, and may relay this information, or a portion thereof, collectively called a data feed 106, over a network to market participants at the client terminal 104. A data feed from one exchange may contain different information representing different tradable objects than another data feed from a second exchange. In one embodiment, a data feed may include market information related to all tradable objects being traded at the host exchange 100. In such an embodiment, when the client terminal 104 receives such a data feed, a trading application on the client terminal 104 may extract from the received data feed information related to one or more tradable object selected by a user at the client terminal 104. Alternatively, the gateway 102 could be configured to extract the information related to tradable objects selected by a particular user at the client terminal 104, and could send only the relevant information to the client terminal 102. Further, alternatively, the host exchange 100 may have knowledge of tradable object(s) that were selected by a user at the client terminal 104, and may provide to the client terminal 104 only market data related to the selected tradable objects.

As used herein, the term "tradable object" refers simply to anything that can be traded with a quantity and/or price. It includes, but is not limited to, all types of tradable objects such as financial products, which can include, for example, stock options, bonds, futures, currency, and warrants, as well as funds, derivatives, and collections of the foregoing, and all types of commodities, such as grains, energy, and metals. The tradable object may be "real," such as products that are listed by an exchange for trading, or "synthetic," such as a combination of real products that is created by a user.

The data feed 106 may include information relating to prices and quantities of one or more tradable objects. For example, the data feed 106 could provide data corresponding to quantities at inside market prices and/or data corresponding to quantity at different prices. The inside market is the highest bid price ("HBP") and the lowest ask price ("LAP") for a tradable object. Data feeds from some exchanges may also provide data related to the market depth. The market depth of a tradable object is each available pending bid and ask quantity (or any aggregation or combination thereof), entered at a particular price. The extent of the market depth available to a trader depends on the host exchange. Some exchanges provide an infinite market depth, while others provide only quantities associated with the inside market and some may provide no market depth.

The client terminal 104 may include any computing terminal, such as a personal computer, a handheld device, or any other currently existing or later developed computing terminals. Further, it should be understood that the client terminal 104 may connect to the gateway 102 via wireless communication links, wireline communication links, or a combination thereof. In general, according to the example embodiments described herein, the client terminal 104 is a computer that allows a trader to participate in the market hosted at the exchange 100, and uses software that creates specialized trading screens on the client terminal. The range and quality of features available to the trader on his or her client terminal's screen may vary according to the specific software application being run on the client terminal 106. Among other functional features, a trading screen being run on the client terminal 106 may enable traders to enter and execute orders, obtain market quotes, and monitor positions. However, it should be understood that, in addition to interactive trading screens, the client terminal 104 may also run automated non-interactive types of trading applications.

A commercially available trading application that allows a user to trade in a system like the one shown in FIG. 1 is X_TRADER® from Trading Technologies International, Inc. of Chicago, Ill. X_TRADER® also provides an electronic trading interface, referred to as MD Trader™, in which working orders and/or bid and ask quantities are displayed in association with a static axis of prices. However, the preferred embodiments are not limited to any particular product that performs translation, storage and display functions.

Portions of the X_TRADER® and the MD Trader™-style display are described in U.S. patent application Ser. No. 09/590,692, entitled "Click Based Trading With Intuitive Grid Display of Market Depth," filed on Jun. 9, 2000, and U.S. patent application Ser. No. 09/971,087, entitled "Click Based Trading With Intuitive Grid Display of Market Depth and Price Consolidation," filed on Oct. 5, 2001, the contents of both are incorporated herein by reference.

Trade Annotations

According to one example embodiment, a client terminal consists of one or more computers (or software applications) that allow a trader to participate in the market hosted at the exchange. More specifically, the client terminal uses one or more trading applications that create specialized trading interfaces. Such trading interfaces, among other functions, enable traders to enter and execute orders and monitor positions in a fast and efficient manner. Additionally, as will be described in reference to the subsequent figures, the trading interface, in conjunction with the client terminal, enables a trader to activate an annotation interface that provides means for a trader to record any information, such as trade and exchange related information that may be retrieved by the trader at a later time. Further, according to the embodiments described below, the annotation interface is preferably displayed in conjunction with, or in relation to, the trading interface, thus, enabling a trader to focus a greater amount of attention on the market in which the trader is participating.

In general, an annotation that is entered by a user may include information regarding the success or failure of a personal trading strategy, daily market depth, market volatility, apparent strategy of another trader, market trends during a predetermined trading day, trader's reasons for making or not making a trade such as based on information in a chart, identifying mistakes, such as bad trades, or any other pertinent information that a trader may find helpful for future trading sessions.

By recording a journal of trading patterns during a single trading day or a number of consecutive trading days, a trader may be able to better identify recurring patterns in the market. Trade annotations kept over a period of time may actually provide a composite of market trends and trader's actions at different times of each trading day. Additionally, a trader may choose to use trade annotations merely to record personal gains, losses, or average prices of tradable objects that he bought or sold. For instance, an annotation entry may appear as follows: "Long 4000 MLNM @ 11.70 (avg.)." However, it should be understood that the present invention is not limited to any particular annotation type or format, but rather may be used for any data that a user deems important. Furthermore, the organization of that information is not restricted to any particular format, but rather it is configurable to accommodate those categories that a user finds to be useful or desirable.

Figure 2:
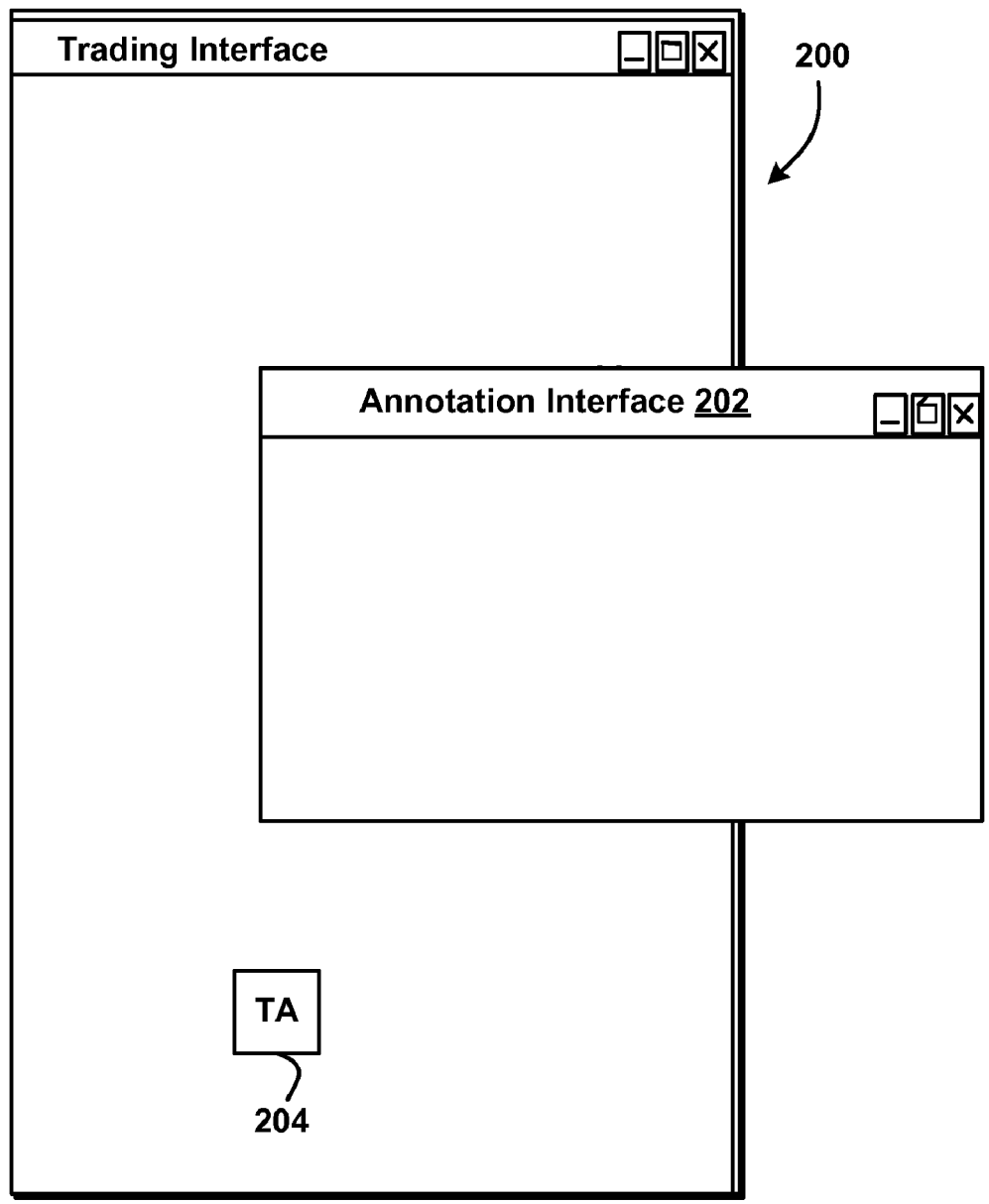
FIG. 2 is a block diagram illustrating a graphical interface for recording user annotations in conjunction with an electronic trading interface in accordance with one embodiment.

FIG. 2 is a block diagram illustrating a graphical interface for recording annotations in an electronic or semi-electronic trading environment. The block diagram includes a first graphical interface, i.e., a trading screen display 200, and a second graphical interface, an annotation interface 202, that allows a user to enter trade-related or other types of annotations. In one embodiment, the trading screen display 200 may be an MD Trader™-style display, which displays information, such as orders to buy or orders to sell, in association with price levels arranged along a common-static axis or scale of prices. It should be understood that in one embodiment, the static axis of prices may display prices; however, alternatively, prices do not need to be displayed.

The trading annotations interface 202 may include one or more pop-up windows, such as a pop-up window illustrated in FIG. 2. However, it should be understood that the trading annotation interface 202 is not limited to one or more pop-up windows, and different types of interfaces, configurable by a user, for example, could also be used. According to an example embodiment, a user may activate and/or deactivate the trading annotation interface 202 by selecting an activation identifier displayed in conjunction with the trading interface 200. FIG. 2 illustrates an example activation identifier, a TA identifier 204, where the "TA" is an abbreviation that stands for "trading annotations." However, it should be understood that different graphical identifiers could also be used. Further, alternatively, it should be understood that any type of input, configurable by a user, may be used to activate the trading annotation interface 202. For example, a selection of a predetermined key or a combination of keys, a sound input, or any other user configurable input could be used to activate the trading annotation interface 202.

One example of the trade annotation interface described herein is a graphical interface including one or more windows that can be moved around the trading display window, and can change their size and shape based on user's needs. In such an embodiment, a window may include icons that represent commands, files, or more windows. One such configuration of the trade annotation interface will be described in reference to the subsequent figure. However, it should be understood that other types of user programmable interfaces could also be used.

Figure 3:
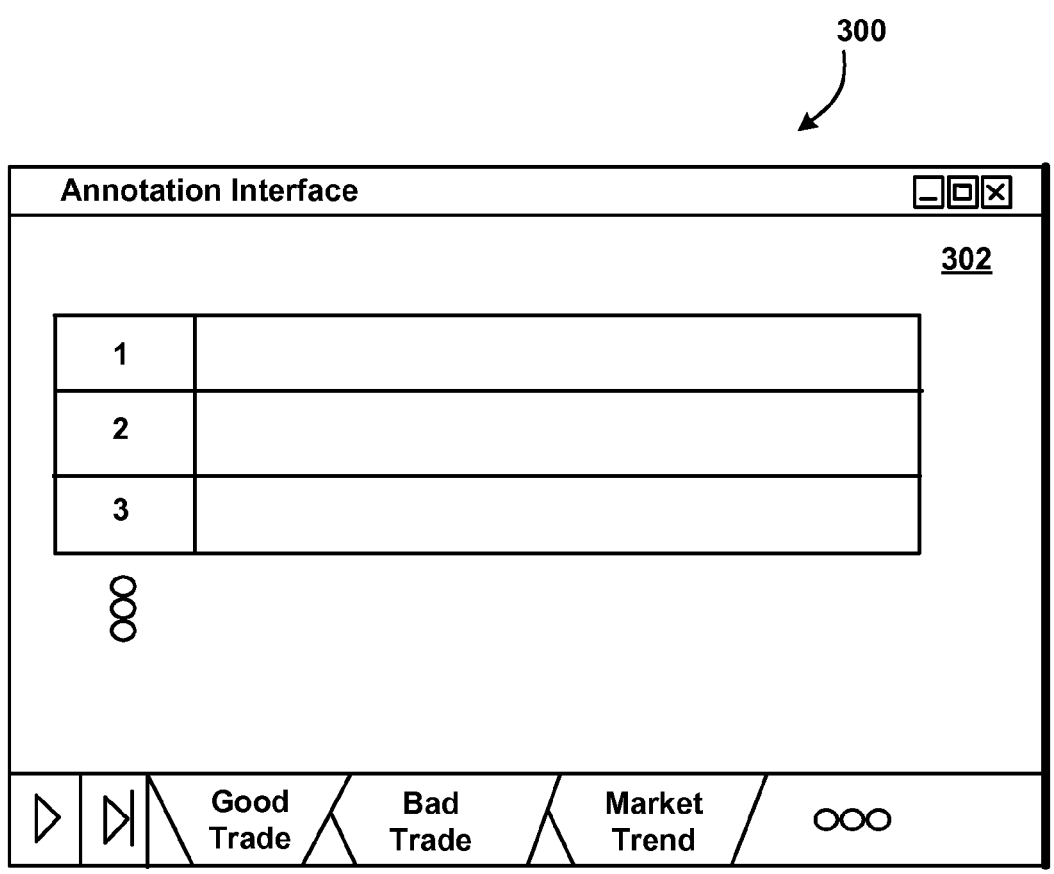
FIG. 3 is a block diagram illustrating an example trading annotation interface that may be used as means for recording user annotations in accordance with one embodiment.

FIG. 3 is a block diagram illustrating an example trading annotation interface that may be used as means for recording and displaying user annotations. An annotation display 300 includes a user entry area 302 and subject matter icons 304. The user entry area 302 may be provided with a predefined document entry format having one or more user entry locations. For example, the user entry area 302 may take a tabular format with rows and columns such as those illustrated in FIG. 3, where rows correspond to record numbers, and columns display trade annotations entered by a user. In such an embodiment, a user may initiate a process of making annotations by selecting a specific area within a table. For example, a user may initiate inputting data into a first record by clicking on or selecting (via a touch screen, for instance) number 1, or clicking or selecting an empty field in the annotations column corresponding to the first record.

In one embodiment, a user may be able to view all records that have been created throughout a trading day, for instance. Using a tabular format display, the records may be organized based on the time of creation of each record so that the first record corresponds to the earliest record in the day and so on. Alternatively, the user entry area 302 may be used exclusively for entering new records, and another icon, displayed in the user entry area 302, when selected by a user, may open a calendar enabling the user to first select a predetermined trading day that, when selected, causes dynamic retrieval and display of all records corresponding to the selected day.

Further, in an alternative embodiment, a user may only flag a particular time and then input data to be associated with that particular time. In such an embodiment, the particular time may be flagged upon receiving a predetermined user input (or command) such as upon detecting a selection of a predetermined key or a combination of keys, or receiving audio data such as receiving a predetermined audio input that is configured to indicate a request to flag a particular time, for instance. In such an embodiment, according to one embodiment, when the time is flagged, a predetermined identifier may be displayed to indicate the flagged time, and then the user may later select the predetermined identifier to input data related to that flagged time. Alternatively, an annotation record may be automatically created, and the user may later select an empty record and input data into that record. It should be understood that the action of flagging a particular time may occur when the annotation interface is displayed to a user. However, alternatively, a user may flag an annotation record when the annotation interface is closed, i.e., not displayed. The embodiment of flagging time first and then inputting data at a later time may be especially beneficial to a trader who wishes to enter an annotation at a specific time, but is consumed with making trades in a fast moving market, for instance. Further, when a time-stamped record is opened but no data is input into the record during a predetermined period of time, a user may be reminded to enter the data into the time-stamped record. For instance, graphical or audio indicators could be used to remind a user to enter data into an annotation record.

Further, it should be understood that a user may configure and control a preferred method of information presentation on the user entry area 302, and those skilled in the art will understand that there are many possible embodiments of presentation of records on the user entry area 302.

Referring back to FIG. 3, the trading annotation display 300 may further include a plurality of subject matter icons 304 that provide means for categorizing trader's annotations through the use of tabs, which serve to divide the trading annotations display into multiple subject areas. FIG. 3 illustrates three example subject matter icons identified as "Good Trades," "Bad Trades," and "Market Trend." In one embodiment, a trader may decide to designate the "Good Trades" to categorize annotations related to strategies that proved beneficial. Similarly, a trader may enter annotations on strategies that proved non-beneficial under the "Bad Trades" category. Lastly, a trader may choose to designate annotations on market trends under the "Market Trend" category. For example, a market trend may be that during the last hour of trading the possibilities for a successful trade may be diminished, because of impulsive and reckless buying and selling by traders who neglected to get their trading done earlier. As such, a trader may want to document that information as a reminder to avoid trading during the final hour of a trading session. In the embodiment illustrated in FIG. 3, the trader could enter such a note under the "Market Trend" category, i.e., by first selecting the "Market Trend" icon, and then entering an annotation into a record under this category.

However, it should be understood that the subject matter icons are not limited to the described icons, and subject matter icons could be user configurable. A user could create more, fewer, different or equivalent icons based on the user's needs and preferences. For instance, another icon such as reasons why a trader made a trade could be created. Furthermore, it should be understood that a user could pre-configure a large number of subject matter categories, but then, instead of displaying icons corresponding to all of the designated categories, the user may control which icons are actually displayed on the trading annotation display during a predetermined trading day. However, it should be understood that the present invention is not limited to displaying category icons, and, in an alternative embodiment, no category icons are displayed.

Additionally, it should be understood that a user may edit each record as well as rearrange the existing records. For instance, a user may create a number of random trade annotations throughout a trading day and then may rearrange them into specific categories pertaining to each record. In one embodiment, the user may place a record into a desired category using a standard "drag and drop" method, or any other feasible method.

In an embodiment in which subject matter categories are used, data records may be organized not only based on the time and day of creation of each record, but also based on categories to which the records correspond. Thus, a user may either view all records that were entered during a predetermined period of time, such as during a trading day, or may view all records under a predetermined category, or a combination thereof. Further, it should be understood that a user can enter data into the trading annotations interface 202 via any suitable means such as a keyboard, a voice input in conjunction with speech-recognition software that converts the voice input into text format, a touch screen, or any combination thereof. Further, in an alternative embodiment, the user may enter audio data that may be recorded into an audio wave file that could be played at a later time upon receiving a request from a user, for instance. In such an embodiment, when the trading annotation interface 202 displays such a record, a predetermined graphical indicator may be used to indicate that the record is in an audio format. The data that is entered by a user, as well as any other information related to the data, may be saved in a database or a memory unit on a client terminal. Alternatively, a gateway that provides network services to a client terminal may store and control display of annotations on the client terminal.

It should be understood that the annotation display 300 described in reference to FIG. 3 is only an example interface, and different embodiments are possible as well. The sample display 300, while indicating a simplified embodiment, may be changed or modified without departing from the scope of the present invention and thereby may apply to the features detailed herein. For example, the annotation display 300 may include a set of additional icons that, when selected by a user, cause specific actions to be performed at a client terminal. For instance, one such icon could be created to notify a support system about system malfunctions. In such an embodiment, when a user selects a support system icon, an e-mail may be dynamically generated and sent to the support group. Such an embodiment may prove especially beneficial when the exact time of the system malfunction is crucial in determining a cause of the problem. In the example embodiment, since a record is automatically time-stamped at the time when the record is opened, the time of creating the record could be automatically embedded into the e-mail that is sent to the support group.

Further, a selection of the support system icon may invoke additional icons indicating a specific problem so that when the user selects the specific icon, a predetermined text describing the problem is automatically attached to the e-mail sent to the support group. It should be understood that many other icons could be created that may cause a system to perform different actions, i.e. actions other than sending e-mails.

Further, it should be understood that a trader may simultaneously participate in multiple markets. For example, if a trader is interested in three separate tradable objects that are traded on three separate exchanges, a trader may wish to follow market activities in several markets. According to an example embodiment, when a trader participates in more than one market, the user entry area 302 may be divided into three separate user entry areas, each labeled with a predetermined identifier corresponding to a specific exchange or a tradable object. In one embodiment, a user may configure the annotation interface to present the three user entry areas. Alternatively, when a trading application on a client terminal detects that a user trades on three different markets, the trading application may dynamically reconfigure the annotation interface to reflect the user's activities. It should be understood that different embodiments are possible as well. For instance, when a user is involved in more than one market, more than one annotation interfaces may be displayed to a user in conjunction with one or more trading interfaces.

Figure 4:
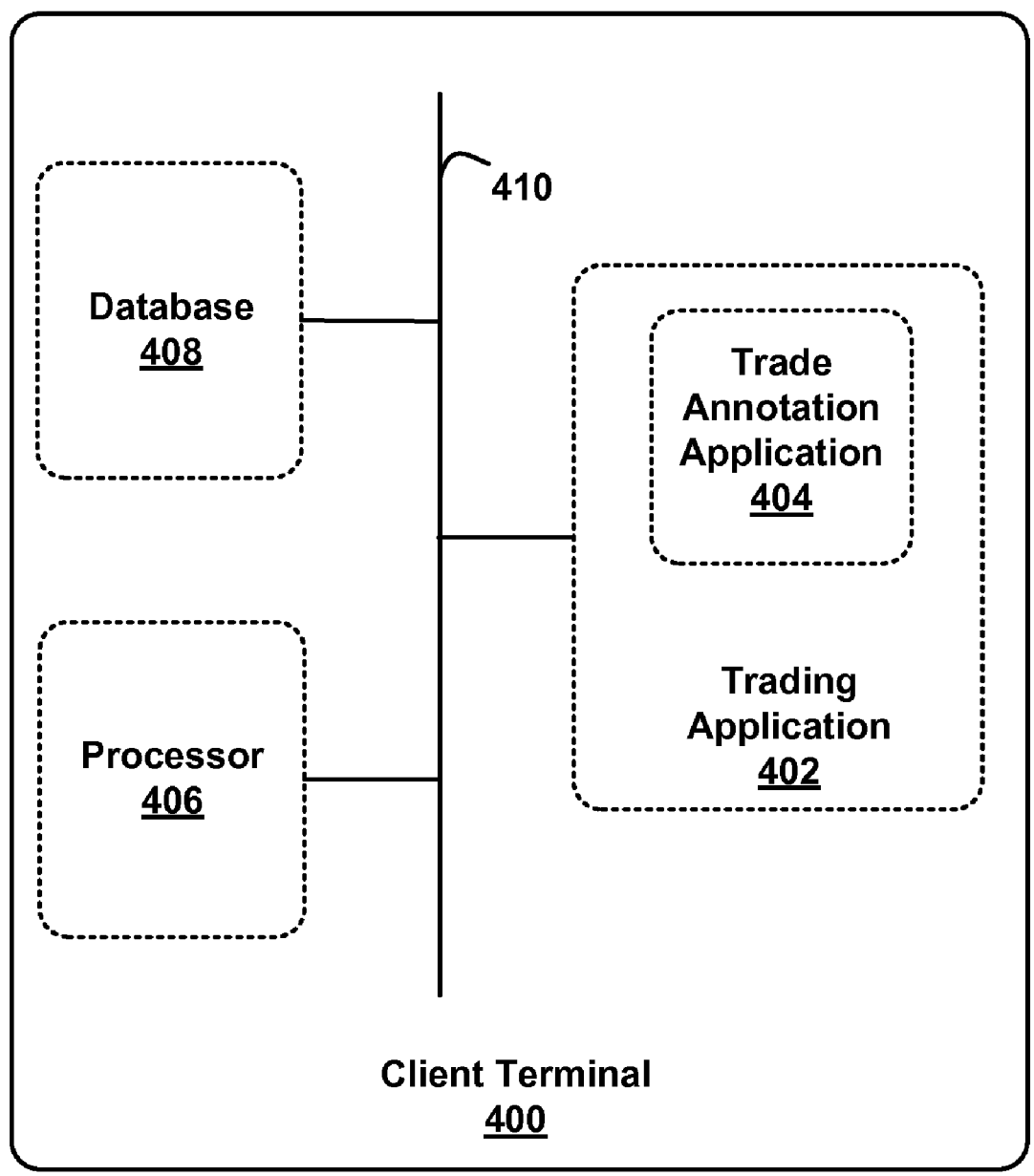
FIG. 4 is a block diagram illustrating an example client terminal providing a trading application with annotation capabilities according to one embodiment.

FIG. 4 is a simplified block diagram of a client terminal 400 according to one embodiment providing a trading application with annotation capabilities. The client terminal 400 includes a trading application 402, a trade annotation application 404, a processor 406, a database 408, and a bus 410 that links all components of the client terminal 400. As described in earlier paragraphs, the use of the trading application 402 allows a trader to view market data, enter and cancel trade orders, as well as view the outstanding orders. A commercially available trading application that allows a user to trade in a system like that shown in FIG. 1 is X_TRADER® from Trading Technologies International, Inc. of Chicago, Ill. that provides an electronic trading interface, MD Trader™.

The trade annotation application 404 enables a trader to activate a trade annotation interface and display it in relation to the trading interface. In the embodiment illustrated in FIG. 4, the trading application 402 and the trade annotation application 404 may share commonly used information. In an alternative embodiment, the trade annotation application 404 is a separate and independent application from the trading application 402. In such an embodiment, the trade annotation application 404 does not necessarily interact with the trading application 402; however, it may share data with the trading application 402. Further, it should be understood that even though FIG. 4 illustrates the trading annotation application 404 installed on the client terminal, in an alternative embodiment, the trade annotation application 404 may be installed at a server and/or a gateway. In such an embodiment, when a user of the client terminal subscribes to a trade annotation service, the client terminal can access the trade annotation application over a computer network. In another alternative embodiment, the trade annotation application 404 is partially installed on the server and/or gateway, and some portions are installed on the client terminal. Such an embodiment may turn out especially beneficial when a client terminal has little processing power or not enough storage space to store information entered by a user. Those skilled in the art will understand that there are many other alternative embodiments.

The database 408 provides local mass storage for the client terminal 400. In one embodiment, the database 408 stores trade annotations in the form of objects, for example. The processor 406 may include any existing or later developed processing unit. It should be understood that the application programs of the trading application 402 and the trade annotation application 404 can be stored in a random access memory, read only memory, or another appropriate storage medium.

Figure 5A:
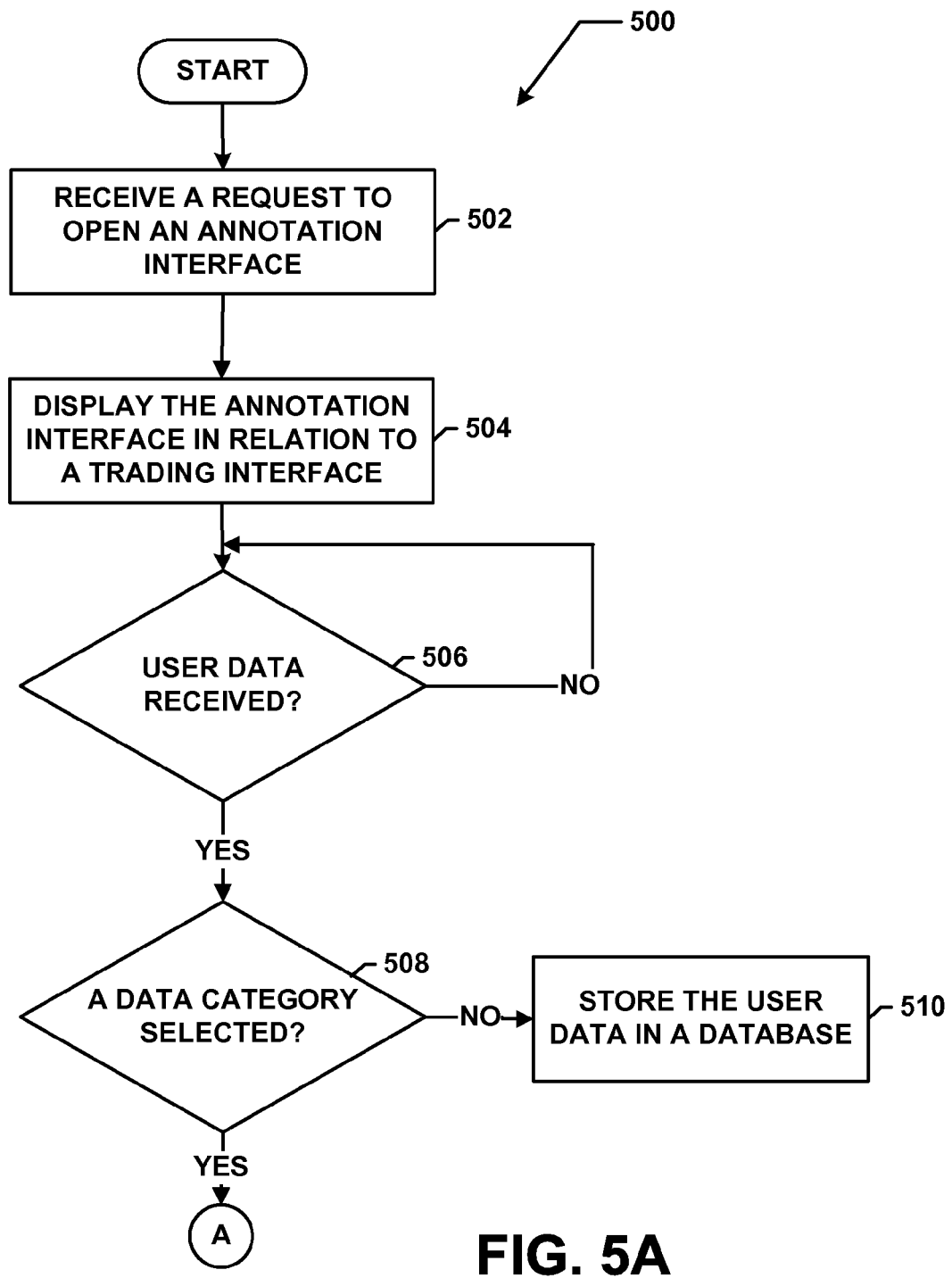
FIGS. 5A and 5B are a flow chart illustrating a method for recording trade-related annotations on a client terminal according to one embodiment.
Figure 5B:
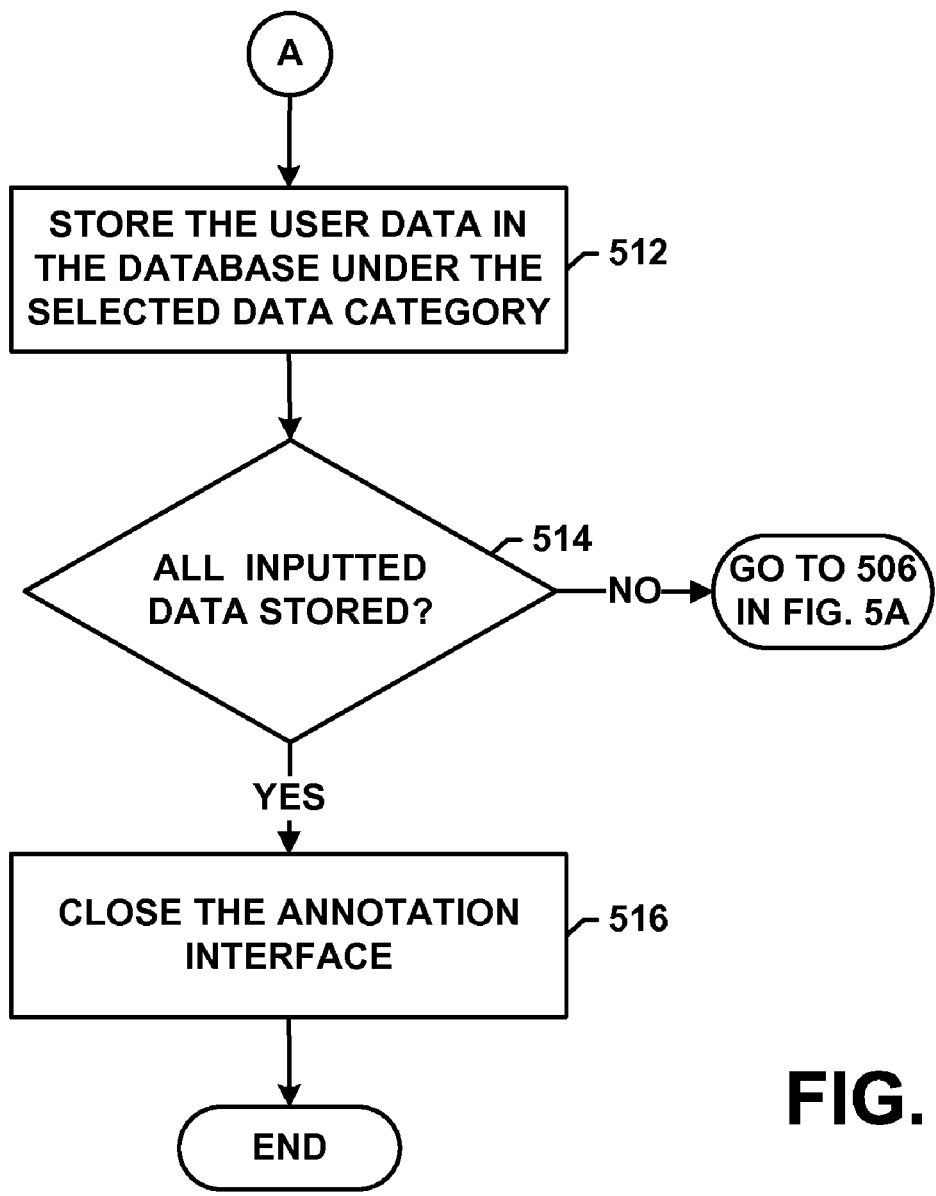

FIGS. 5A and 5B are a flow chart illustrating a method 500 for recording annotations at a client terminal.

Referring to FIG. 5A, at step 502, a request to open an annotation interface is detected on a client terminal. In an embodiment in which the client terminal includes an annotation application, the annotation application may make such a determination. It should be understood that the request is detected after trade-related data is fed to the client terminal from one or more exchanges and after a trading interface is displayed on the client terminal so that a user is provided with means to enter orders and view market data provided by the exchange. According to one embodiment, the trading interface may display a trade annotation identifier which, when selected, e.g., via a touchscreen, a mouse input, or other means, invokes the request to open the trade annotation interface. Alternatively, a predetermined audio input may be recognized as a request to open the trade annotation interface.

When a request to activate the trade annotation interface is received, at step 504, the annotation interface is displayed via the client terminal. According to one embodiment, the annotation interface may have a format of one or more windows that are displayed in relation to the trading interface. However, different embodiments are possible as well.

At step 504, the annotation application determines if user data has been received. It should be understood that the user data may include text data, audio data, or a combination thereof. If the user data has not been received, the application interface may continue checking if any data is received for the record while the annotation interface remains open. Alternatively, if no data is received for a predetermined period of time, such as a time period configured by a user, the annotation application may close the annotation interface, and the user may reactivate it later by selecting the annotation interface identifier, or via other means.

If user data is received for the record, and if a number of category icons are provided via the annotation interface, at step 508, the annotation application determines if one of the category icons has been selected by a user before receipt of the user data. If no category has been selected, at step 510, the user data is stored in a database under one of the data objects associated with a predetermined trading day, for example. Alternatively, if a data category has been selected, at step 512 in FIG. 5B, the user data is stored under one of the data objects associated with the selected category and is marked with an identifier corresponding to a predetermined trading day. Alternatively, the user data may be stored in one of the objects associated with that trading day, and additionally may be marked with a predetermined identifier associated with the selected category. It should be understood that when the record is opened by the user, e.g., when the user starts inputting data, the record is time-stamped with a time when the first user input was received for the record.

It should be understood that the present invention is not limited to any predetermined data storage arrangement, and those skilled in the art will recognize that there are many possible embodiments to organize user records in the database. Further, it should be understood that in one embodiment such as the one illustrated in FIG. 4, for example, the database is located on the client terminal. However, it should be understood that in an alternative embodiment, the database may be a distributed database. In such an embodiment, some records may be stored on the client terminal and some on a remote network entity, such as a gateway. Further, alternatively, a gateway may maintain a database including all user records, and a user of the client terminal may access the records via a network connection to the gateway.

Finally, at step 514, the annotation application may determine if all data, inputted via the annotation interface, has been stored. If all data has been stored, at step 516, the annotation application may close the annotation interface until another activation request is received from a user. If data has not yet been stored, the method may continue at step 506 in FIG. 5A, where the determination is made as to whether or not new user data has been received, and the method may proceed to repeat the steps as they were previously described herein.

Figure 6:
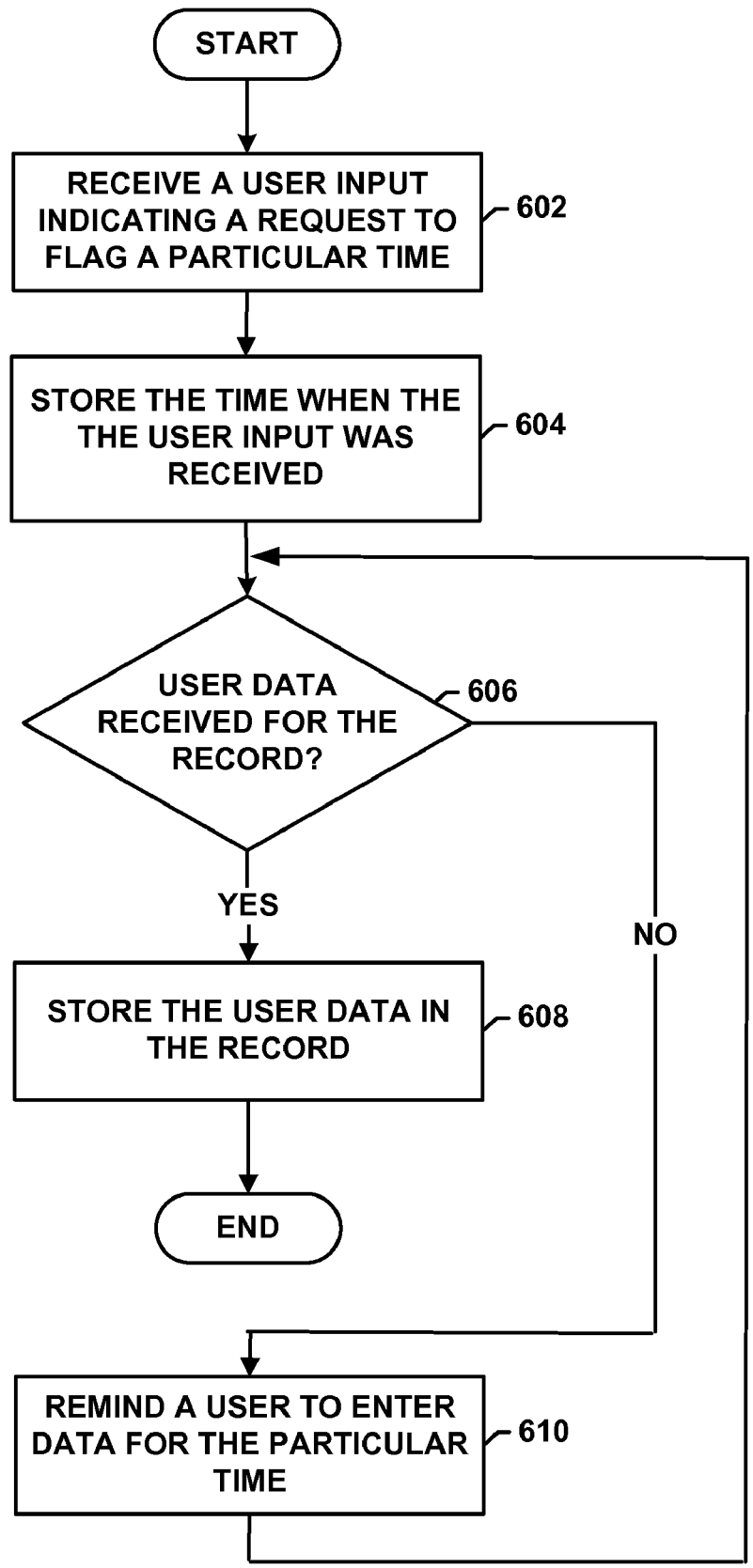
FIG. 6 is a flow chart illustrating a method for flagging a particular time and later inputting an annotation in an annotation record associated with the particular time.

FIG. 6 is a flow chart illustrating another method for flagging a particular time and then recording user data at a later time into a record associated with the flagged time.

At step 602, the annotation application detects a user input indicating a request to flag a particular time. The user input to flag a record may take many formats and may be user configurable. For instance, a selection of one or more keys, a predetermined audio input, or a predetermined input received via a touchscreen may be recognized by the annotation application as a request to flag a particular time. It should be understood that the user input may be received when the annotation interface is activated, i.e., displayed in relation to the trading interface, or when the annotation interface is deactivated, i.e., not displayed.

When the user input indicating a request to flag a particular time is received, at step 604, the annotation application stores the time when the request was received. In one embodiment, a predetermined identifier may be generated and displayed to a user, and the user may later select the identifier to input data to be associated with the predetermined flagged time. As was explained earlier, such an embodiment may prove beneficial when a user does not have time to enter annotations at a particular time, but would like to open a record and mark the record with that time, and then later go back and enter data into the time-stamped record. At step 606, the annotation application determines if user data has been received for the flagged time. If the user data has been received, at step 608, the annotation application stores the received user data in a record and associates the record with the particular time that was earlier flagged by the user. It should be understood that the time used by the annotation application may be a system time. Alternatively, the time used at the annotation application may be provided by any outside means, such as a time signal provided by an exchange or any other network entity.

If no user data is received for a predetermined period of time, such as a time period configured by a user, at step 610, the trading application may prompt a user to enter data, and the method proceeds to step 606 and repeats the steps as they were previously described herein.

According to one embodiment, at the end of a trading day, or at any time during the trading day, a user can view the annotations that were stored in the database or other storage means on a client terminal or on another network entity. In addition to simply retrieving and viewing the stored annotations, a user may also correlate the annotations with market data, such as market data provided by third parties, corresponding to a particular trading day or a specific time during the trading day. Further, additionally, a trading application at a client terminal may store historical data related to trading activities of a user. It should be understood that the present invention is not limited to storing the historical data on the client terminal, and the historical data could also be stored at any other network entity. For example, the historical data could include trade-related data for the last 10 days. However, it should be understood that the historical data could be stored for more or fewer days as well. The historical data includes market data such as market depth, inside market, last traded price, last traded quantity, or settlement data, for instance.

Further, alternatively, when a user creates an annotation record or flags a particular time, a market snapshot, i.e., a screen snapshot of a market displayed on the trading interface, may be stored on a client terminal that may be later viewed by the user in combination with that specific annotation. Alternatively, a client terminal may be configured to continuously record market data for a few minutes, and then overwrite the recorded data if no predetermined input is received. For example, the predetermined input may include receiving a request to open an annotation record or to flag a particular time. For instance, the client terminal may record market data for a period of five minutes. Then, if no predetermined input is received, after five minutes, the client terminal may rewrite the recorded data and start recording data for the next five minutes. However, if the predetermined input is received, the client terminal would not rewrite the market data with new market data, but would store the market data and make it available to a user in combination with the annotation specified during that five minutes. It should be understood that different time periods are possible as well, and the present invention is not limited to recording market data in five minutes time increments.

In one embodiment, the annotation interface, such as the one illustrated in FIG. 3, may include a number of icons corresponding to types of data that may be correlated with a particular annotation or with a number of consecutive annotations entered by a user. In one embodiment, the trading application may enable a user to replay market activities within a predetermined time period including the time when a specific annotation was recorded. For example, ten minutes of market activities around the time flagged in a specific annotation record could be played for a user. In such an embodiment, market data may be obtained from a market simulator that includes data related to a tradable object associated with the annotation record. A market simulator may be a software program (or programs) hosted at a computer that is connected to one or more host exchanges and records market data directly from the exchanges throughout the trading day.

The recorded data is then stored at a computer, in a database, or some other storage means associated with the market simulator. The stored market data on the market simulator may then be retrieved for the use at the annotation application. A market simulator is described in U.S. patent application Ser. No. 10/233,023, entitled "System and Method for Simulating an Electronic Trading Environment," filed on Aug. 30, 2002, the contents of which are fully incorporated herein by reference. Using a market simulator, the market data may be played in real time, or it can be slowed down or played at an accelerated rate. It should be understood that the annotation interface may provide means enabling a user to actively control or pre-configure how fast or how slow the market data is played, or how much market data around a desired time should be played, for instance.

It should be understood that any synchronization method could be developed to ensure that a system time used on a client terminal is synchronized with the time on a market simulator so that when a user requests to view market data during a predetermined period of time including a time flagged in a specific annotation record, market data corresponding to the specified time period is selected from the market data on the market simulator. It should be understood that any synchronization method could be used, and the precision of the synchronization may depend on requirements of each user. Alternatively, it is possible to determine a time difference between the time used on the client terminal and the time used on a market simulator. In such an embodiment, the known time difference may be used to select market data corresponding to the requested time period by simply adding or subtracting the time difference to/from the time used on a market simulator, for instance.

In an embodiment, in which a user may correlate the user annotation with historical data, the user may configure a time window to play the market data around the time specified in a predetermined annotation record. For instance, the user may view five minutes, or any other predetermined time period, of the market data. In such an embodiment, the market data is replayed to the user. It should be understood that any synchronization method could be used to synchronize the time used at the annotation application and the time that was used to store historical data.

Further, it should be understood that annotations records may be correlated with other types of data such as news or market charts being provided by third parties such as Bloomberg, Reuters, and other such information providers. Those skilled in the art will understand that different embodiments falling within the scope of the present invention are also possible.

It should be understood that the above description of the preferred embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

Further, it will be apparent to those of ordinary skill in the art that methods involved in the system and method for recording annotations in an electronic trading environment may be embodied in a computer program product that includes one or more computer readable media. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed:

1. A method for annotating market information, the method comprising:

receiving substantially real-time market data for a tradeable object via a processor;

displaying, via the processor, the market data in a first display region of an output device associated with the processor;

receiving a first user command via an input device associated with the processor, the first user command flagging a portion of the market data displayed in the first display region;

in response to receiving the first user command, creating, via the processor, an annotation marker identifying the portion of the market data;

displaying, via the processor, a user-selectable indicator associated with the annotation marker in a second display region of the output device;

receiving a second user command via the input device selecting the indicator;

in response to receiving the second user command, displaying an annotation record via the output device;

receiving user data via the annotation record; and storing the user data associated with the annotation record via the processor.

2. The method of claim 1 where the user data comprises any of audio data, textual data, or a combination thereof.

3. The method of claim 1, further comprising displaying the user data associated with the annotation record via the output device in response to a third user command received via the input device.

4. The method of claim 3, further comprising displaying the portion of the market data via the output device.

5. The method of claim 1, further comprising displaying the portion of the market data via the output device in response to a third user command received via the input device.

6. The method of claim 1, further comprising displaying an activation identifier relative to the first display region to activate the second display region.

7. The method of claim 6, further comprising displaying the activation identifier in the first display region.

8. The method of claim 6, further comprising displaying the second display region in response to a selection of the activation identifier via a third user command received via the input device.

9. The method of claim 1 where the first display region comprises a trading screen interface.

10. The method of claim 1 where the second display region comprises at least one pop-up window.

11. The method of claim 1, further comprising recording the portion of the market data and the time the first user command was received in response to the first user command.

12. The method of claim 11 where recording the portion of the market data comprises recording the market data corresponding to the time the first user command was received.

13. The method of claim 12, further comprising:

receiving a user request to view the recorded market data corresponding to time the first user command was received; and displaying the recorded market data in response to the user request.

14. The method of claim 11 where recording the portion of the market data comprises recording a screenshot of the first display region at the time the first user command was received.

15. The method of claim 11 where recording the portion of the market data comprises:
- recording the market data being displayed via the first display region for a time period determined by a moving time window; and
- storing the market data corresponding to the moving time window in response to a command to flag a time to create an annotation received during the moving time window.

16. A method for annotating market data, the method comprising:
- receiving market data via a processor, the market data identifying a current best bid price and a current best ask price for a tradeable object;
- displaying, via the processor, the market data in a trading screen interface of an output device associated with the processor in response to receiving the market data;
- receiving a first user command relative to the trading screen via an input device associated with the processor to flag associated market data;
- displaying, via the processor, an annotation indicator in an annotation interface of the output device in response to the first user command, the annotation indicator being user-selectable to complete an annotation record for the associated market data;
- receiving a second user command selecting the annotation indicator via the input device;
- displaying the annotation record on the output device in response to the second user command;
- receiving user data via the annotation record; and
- storing the user data in a database associated with the processor.

17. The method of claim 16 where the user data is any of audio data, textual data, or a combination thereof.

18. The method of claim 16, further comprising time-stamping the user data according to a time corresponding to receipt of the user data.

19. The method of claim 16, further comprising providing the user data via the output device in response to a third command user command.

20. The method of claim 17, further comprising displaying the associated market data via the output device in response to a third user command.

21. A non-transitory computer readable medium having computer executable instructions stored therein to cause the computer to carry out a method comprising:
- receiving substantially real-time market data for a tradeable object via a processor;
- displaying the market data in a first display region of an output device associated with the processor;
- receiving a first user command via an input device associated with the processor, the first user command flagging a portion of the market data displayed in the first display region;
- in response to receiving the first command, creating an annotation marker identifying the portion of the market data;
- displaying a user-selectable indicator associated with the annotation market marker in a second display region of the output device;
- receiving a second user command via the input device selecting the indicator;
- in response to receiving the second user command, displaying an annotation record via the output device;
- receiving user data via the annotation record; and
- storing the user data associated with the annotation record.

22. A non-transitory computer readable medium having computer executable instructions stored therein to cause the computer to carry out a method comprising:
- receiving market data via a processor, the market data identifying a current best bid price and a current best ask price for a tradeable object;
- displaying the market data in a trading screen interface of an output device associated with the processor in response to receiving the market data;
- receiving a first user command relative to the trading screen via an input device associated with the processor to flag associated market data;
- displaying an annotation indicator in an annotation interface of the output device in response to the first user command, the annotation indicator being user-selectable to complete an annotation record for the associated market data;
- receiving a second user command selecting the annotation indicator via the input device;
- displaying the annotation record on the output device in response to the second user command;
- receiving user data via the annotation record; and
- storing the user data in a database associated with the processor.

* * * * *